(12) United States Patent
Schanz et al.

(10) Patent No.: US 11,585,708 B2
(45) Date of Patent: Feb. 21, 2023

(54) LOAD MEASURING METHOD, LOAD MEASURING DEVICE AND LOAD MEASURING ARRANGEMENT

(71) Applicant: Trafag AG, Bubikon (CH)

(72) Inventors: Christoph Schanz, Frickenhausen (DE); Philipp Cörlin, Stuttgart (DE); Tobias Ettenauer, Stuttgart (DE); Tobias Senkbeil, Heidenheim (DE); Dieter Zeisel, Forch (CH)

(73) Assignee: Trafag AG, Bubikon (CH)

( * ) Notice: Subject to any disclaimer, the term of this patent is extended or adjusted under 35 U.S.C. 154(b) by 570 days.

(21) Appl. No.: 16/622,195

(22) PCT Filed: Jun. 11, 2018

(86) PCT No.: PCT/EP2018/065405
§ 371 (c)(1),
(2) Date: Dec. 12, 2019

(87) PCT Pub. No.: WO2018/229016
PCT Pub. Date: Dec. 20, 2018

(65) Prior Publication Data
US 2020/0116579 A1 Apr. 16, 2020

(30) Foreign Application Priority Data
Jun. 12, 2017 (DE) .................... 10 2017 112 913.8

(51) Int. Cl.
*G01L 3/10* (2006.01)
*G01L 1/12* (2006.01)
(Continued)

(52) U.S. Cl.
CPC .............. *G01L 3/105* (2013.01); *G01L 1/127* (2013.01); *G01L 1/12* (2013.01); *G01L 1/122* (2013.01);
(Continued)

(58) Field of Classification Search
CPC . G01L 3/102; G01L 3/105; G01L 3/10; G01L 3/101; G01L 3/00; G01L 3/103;
(Continued)

(56) References Cited

U.S. PATENT DOCUMENTS 4,989,460 A * 2/1991 Mizuno ................... G01L 3/102
73/862.335
5,542,304 A * 8/1996 Sasada ................... B23Q 17/09
73/862.06
(Continued)

FOREIGN PATENT DOCUMENTS

DE 3031997 A1 3/1982
DE 3511442 A1 * 10/1986 ............... G01L 3/10
(Continued)

*Primary Examiner* — Jonathan M Dunlap
(74) *Attorney, Agent, or Firm* — United One Law Group LLC; Kongsik Kim; Jhongwoo Peck (57) ABSTRACT

To improve the output signal quality of a load measurement by means of active magnetization, the invention provides a load measurement method for measuring a mechanical load on a test object (14), comprising:
a) generating and applying a magnetic field to the test object (14);
b) detecting a magnetic field changed by the test object (14) as a result of a mechanical load on the test object (14) by means of a first magnetic field detection device (20) to generate a first measurement signal (U1, UAB),
c) detecting a magnetic field changed by the test object (14) as a result of a mechanical load on the test object (14) by means of a second magnetic field detection device (22) to generate a second measurement signal (U1, UAB),
d) computationally determining a third measurement signal (UBT) from the first measurement signal (U1, UAB) and the second measurement signal (U2, UAT), and preferably comprising the steps of
(Continued)

e) forming a difference from one (U2, UAT) of the first and the second measurement signals and the computationally determined third measurement signal (UBT) to produce an output signal, f) determining the mechanical load applied to the test object (14) based on the output signal.

The invention also provides a corresponding load measurement device for carrying out the load measurement method.

15 Claims, 6 Drawing Sheets

(51) Int. Cl.
G01L 9/16 (2006.01)
G01L 5/22 (2006.01)
G01L 25/00 (2006.01)

(52) U.S. Cl.
CPC ............... *G01L 1/125* (2013.01); *G01L 3/10* (2013.01); *G01L 3/101* (2013.01); *G01L 3/102* (2013.01); *G01L 5/221* (2013.01); *G01L 5/228* (2013.01); *G01L 9/16* (2013.01); *G01L 25/003* (2013.01)

(58) Field of Classification Search
CPC ....... G01L 3/1435; G01L 1/125; G01L 1/127; G01L 1/12; G01L 1/122; G01L 1/246; G01L 9/16; G01L 9/007; G01L 9/10; G01L 25/00; G01L 25/003; G01R 15/205; G01R 15/185; G01R 33/091; G01R 33/246; G01R 33/4824; G01R 33/4831; G01R 33/0017; G01R 33/0035; G01R 33/04; G01R 33/12; G01R 33/18; G01R 35/005

See application file for complete search history.

(56) References Cited

U.S. PATENT DOCUMENTS

| | | | | |
|---|---|---|---|---|
| 10,094,720 | B2* | 10/2018 | Sipila | G01L 3/102 |
| 10,113,921 | B2* | 10/2018 | Lu | G01L 1/125 |
| 10,184,846 | B2* | 1/2019 | Lu | G01D 3/0365 |
| 10,267,693 | B2* | 4/2019 | Lu | G01L 3/101 |
| 10,345,167 | B2* | 7/2019 | Lu | G01L 3/105 |
| 10,444,086 | B2* | 10/2019 | Sipila | G01L 3/102 |
| 10,663,363 | B2* | 5/2020 | Lu | G01L 3/102 |
| 11,099,086 | B2* | 8/2021 | Lu | G01L 3/102 |
| 11,193,839 | B2* | 12/2021 | Lu | G01L 3/101 |
| 2016/0363488 | A1* | 12/2016 | Sipila | G01R 33/091 |
| 2017/0336274 | A1* | 11/2017 | Lu | G01L 1/125 |
| 2018/0058957 | A1* | 3/2018 | Lu | G01L 3/101 |
| 2018/0058958 | A1* | 3/2018 | Lu | G01D 5/2046 |
| 2019/0017888 | A1* | 1/2019 | Lu | G01L 3/102 |
| 2019/0041279 | A1* | 2/2019 | Sipila | G01L 1/125 |
| 2019/0162610 | A1* | 5/2019 | Lu | G01L 3/102 |
| 2019/0310147 | A1* | 10/2019 | Lu | G01L 3/102 |
| 2020/0209080 | A1* | 7/2020 | Lu | G01L 3/102 |

FOREIGN PATENT DOCUMENTS

| | | | |
|---|---|---|---|
| DE | 60007641 T2 | 11/2004 | |
| DE | 69936138 T2 | 2/2008 | |
| EP | 0168692 A2 | 1/1986 | |
| EP | 1772716 A1 | 4/2007 | |
| EP | 2615439 A1 | 7/2013 | |
| EP | 3051265 A1 * | 8/2016 | ............. G01L 1/127 |

* cited by examiner

FIG 6 (Stand der Technik)

FIG 7  (Stand der Technik)

FIG 8  (Stand der Technik)

FIG 9  (Stand der Technik)

LOAD MEASURING METHOD, LOAD MEASURING DEVICE AND LOAD MEASURING ARRANGEMENT

RELATED APPLICATIONS

This application is a 35 U.S.C. 371 national stage filing of International Application No. PCT/EP2018/065405, filed on Jun. 11, 2018, which claims priority to German Patent Application No. 10 2017 112 913.8(DE), filed Jun. 12, 2017. The contents of the aforementioned applications are hereby incorporated by reference in their entireties.

The invention relates to a method, device and arrangement for measuring a mechanical load on a test object. Loads are defined as forces, torques or mechanical stresses on the test object.

It is known that the physical measured values torque, force and position on ferromagnetic objects can be determined using magnetic measurement methods. Magnetoelastic (or also inverse magnetorestrictive) sensors or eddy current sensors are mostly used. The ferromagnetic materials used change their permeability under the influence of tensile or compressive stresses (also called Vilari effect). In practice, it is usually difficult to differentiate between the individual effects, only the eddy current sensor is easier to distinguish from the other effects by its frequency dependence. In addition, the magnetization state of the object is often not known or is strongly influenced by the processing and handling of the objects, so that a broad industrial application is often difficult. In addition, it is often impossible to predict the service life of magnetized objects under the often quite harsh environmental conditions in which the technology is used (for example, but not exclusively heavy industry, gears, hydraulic systems in construction machinery or agricultural machinery and much more).

It is known from EP 3 051 265 A1 that this disadvantage can be compensated by active magnetization using an alternating magnetic field in the kHz range. For this purpose, generator and detector coils are used, namely two first magnetic field detection coils A1, A2 and two second magnetic field detection coils B1, B2 and a central generator coil Lg in a cross arrangement (X arrangement). The difference of the coil pair $A-B=(A1+A2)-(B1+B2)$ is determined in an analog signal processing scheme.

On the basis of this prior art, it is an object of the invention to provide a load measurement method, a load measurement device and a load measurement arrangement with improved signal quality.

To achieve this object, the invention provides the method, the device and the arrangement according to the independent claims.

Advantageous designs are the subject of the subclaims.

Preferably, an improved signal-to-noise ratio should be achieved with advantageous designs, in particular with an improved possibility of determining a load direction.

Particularly preferred designs concern a torque sensor circuit for an optimal signal-to-noise ratio without phase effects or a method that can be implemented with it.

According to a first aspect, the invention provides a load measurement method for measuring a mechanical load on a test object, the method comprising:
a) applying a magnetic field to the test object,
b) detecting a magnetic field changed by the test object as a result of a mechanical load on the test object by means of a first magnetic field detection device to generate a first measurement signal,
c) detecting a magnetic field changed by the test object as a result of a mechanical load on the test object by means of a second magnetic field detection device to generate a second measurement signal, and
d) computationally determining a third measurement signal from the first measurement signal and the second measurement signal and determining the load from the third measurement signal and from at least one of the first and the second measurement signals.

Preferably, the method comprises the steps of:
e) forming the difference between one of the first and the second measurement signals and the computationally determined third measurement signal to produce an output signal; and
f) determining the mechanical load applied to the test object based on the output signal.

It is preferred that step a) comprises:
generating a magnetic field and applying the generated magnetic field to the test object.

It is preferred that step b) comprises:
detecting the changed magnetic field by means of multiple series-connected magnetic field sensors and tapping a sum or differential signal from these magnetic field sensors and that step c) comprises:
detecting the changed magnetic field by means of one or a subset of these magnetic field sensors for tapping a partial signal from said one or from said subset of magnetic field sensors.

It is preferred that step b) comprises detecting the changed magnetic field by means of at least one first magnetic field sensor and at least one second magnetic field sensor and tapping a differential signal from said at least one first and said at least one second magnetic field sensor in analog fashion to generate the first measurement signal.

It is preferred that step c) comprises detecting the changed magnetic field by means of said at least one first magnetic field sensor to generate the second measurement signal.

It is preferred that step d) comprises computationally determining the measurement signal of the second magnetic field sensor from the differential signal and the measurement signal of the first magnetic field sensor.

It is preferred that step b) comprises detecting the changed magnetic field by means of at least two first magnetic field sensors and at least two second magnetic field sensors and that step b) comprises using an interconnection of the magnetic field sensors such that in each case the signals of a pair of a first and a second magnetic field sensor added in analog fashion and the signals of the pairs subtracted in analog fashion are output as an analog differential signal.

It is preferred that further the sum signals of the at least one first magnetic field sensor and of the at least one second magnetic field sensor are tapped and evaluated in particular for determining a distance to the test object.

It is preferred that, as a third measurement signal, an amplitude of the signal of the at least one second magnetic field sensor is determined in order to determine as a resultant signal a difference of the amplitudes of the signals from the at least one first magnetic field sensor and the at least one second magnetic field sensor.

It is preferred that a coil or a solid-state magnetic field sensor is used as a magnetic field sensor.

It is preferred that the interconnection of said multiple magnetic field sensors is varied in order tap different sum and differential signals from said multiple magnetic field sensors.

It is preferred that at least one sensor head is used which comprises magnetic field sensors of the first and second magnetic field detection devices and a generator coil of the magnetic field generating device.

It is preferred that multiple sensor heads which each include magnetic field sensors of the first and second magnetic field detection devices and a generator coil of the magnetic field generating device are distributed around the test object and are used for common measurement signal generation.

It is preferred that at least one sensor head is used which comprises planar coils as magnetic field sensors of the first and second magnetic field detection devices and as a generator coil of the magnetic field detection device which arranged in or on a printed circuit board element.

It is preferred that step a) comprises imposing an alternating magnetic field, in particular with frequencies from 1 kHz to 1000 kHz.

It is preferred that steps b) and c) comprise averaging the measurement signals over several wave trains, preferably averaging over between 10 and 10000 wave trains.

It is preferred that steps b) and c) comprise average common-mode clocking for amplitude measurement.

It is preferred that at least one X arrangement or V arrangement of magnetic field sensors of the first and second magnetic field detection devices and the magnetic field generating device with a common ferromagnetic amplifier core are used.

It is preferred that multiple X or V arrangements are used and distributed around the test object.

According to another aspect, the invention provides a load measurement device for measuring a mechanical load on a test object, the load measurement device comprising:
a magnetic field generating device for applying a magnetic field to the test object,
a first magnetic field detection device for detecting a magnetic field changed by the test object as a result of a mechanical load on the test object and for supplying a first measurement signal,
a second magnetic field detection device for detecting a magnetic field changed by the test object as a result of a mechanical load on the test object and for supplying a second measurement signal, and
a computing device for computationally determining a third measurement signal form the first measurement signal and the second measurement signal, and
an evaluation device configured to generate, from the third measurement signal and at least one of the second and first measurement signals, an output signal indicating the load on the test object.

Preferably, the evaluation device is configured to form a difference from one of the first and second measurement signals and the computationally determined third measurement signal in order to produce an output signal based on which the mechanical load applied to the test object can be determined.

It is preferred that the first magnetic field detection device includes at least one first magnetic field sensor and at least one second magnetic field sensor and is configured to tap a difference of amplitudes of signals of the first and the second magnetic field sensor from the at least one first and the at least one second magnetic field sensors, this difference forming the first measurement signal.

It is preferred that the first magnetic field detection device includes multiple magnetic field sensors connected in series in order to tap a common signal from said multiple magnetic field sensors.

It is preferred that the second magnetic field detection device includes one or a subset of these magnetic field sensors belonging to the first magnetic field detection device in order to tap a signal from only a portion of the magnetic field sensors of the first magnetic field detection device.

It is preferred that the second magnetic field detection device comprises the at least one first magnetic field sensor and is configured to output an amplitude as a second measurement signal from the first magnetic field sensor.

It is preferred that the computation device is configured to computationally determine the amplitude of the second magnetic field sensor from the differential signal and the measurement signal of the first magnetic field sensor and output the same as a third measurement signal.

It is preferred that the first magnetic field detection device comprises at least two first magnetic field sensors and at least two second magnetic field sensors and an interconnection or interconnection option (e.g. by means of an interconnection path and/or a switching device) of the magnetic field sensors such that in each case the signals of a pair of a first and a second magnetic field sensor added in analog fashion and the signals of the pairs subtracted in analog fashion are output as an analog differential signal.

It is preferred that there is further provided a sum signal tapping device for tapping sum signals of the at least one first magnetic field sensor and the at least one second magnetic field sensor, wherein in particular the evaluation device is configured to determine a distance to the test object by evaluating the sum signals.

It is preferred that the computation device is configured to determine, as a third measurement signal, an amplitude of the signal of the at least one second magnetic field sensor and that the evaluation device is configured to determine, as a resulting output signal, the difference of amplitudes of the signals from the at least one first magnetic field sensor and the at least one second magnetic field sensor.

It is preferred that coils or solid-state magnetic field sensors are used as magnetic field sensors.

It is preferred that the magnetic field generating device is configured to impose an alternating magnetic field, in particular with frequencies of 1 kHz to 1000 kHz, on the test object.

It is preferred that the evaluation device is configured to average the measurement signals over multiple wave trains, wherein preferably averaging over between 10 and 10000 wave trains is carried out.

It is preferred that a common mode device for an average common mode of the magnetic field sensors for amplitude measurement is provided.

It is preferred that the magnetic field sensors of the first and second magnetic field detection devices and the magnetic field generating device form an X arrangement or a V arrangement with a common ferromagnetic amplification core.

The invention also relates to a load measurement arrangement comprising a load measurement device according to one of the above-described designs and a test object the load of which is to be measured.

The different designs of the load measurement device are suitable for implementing configurations of the load measurement method.

The different configurations of the load measurement method can be implemented by designs of the load measurement device or the load measurement arrangement.

Embodiments of the invention will be described in more detail in the following with reference to the attached drawings wherein it is shown by FIG. 1 a first preferred embodiment of a sensor head of a load measurement device for measuring a mechanical load such as force, tension or torque on a test object.

FIGS. 1 to 5 show various embodiments of sensor heads 10 for a load measurement device 12. The load measurement device 12 serves to measure mechanical loads such as in particular torques, forces or tensions in a test object 14 that can be at least partially magnetized, as for example a shaft, a power transmission device, a transmission component, a bolt, a membrane (e.g. of a pressure sensor) or the like, and that is made of or with ferromagnetic materials. The test object 14 and the load measurement device 12 together form a load measurement arrangement 16.

The load measurement device 12 includes a magnetic field generating device 18 and multiple magnetic field detection devices 20, 22.

The magnetic field generating device 18 includes a generator coil Lg and a driver circuit 24 (see FIGS. 6, 11 and 12) for driving the generator coil Lg.

The magnetic field detection devices 20, 22 have magnetic field sensors 26 in the form of detector coils A1, A2, B1, B2 or solid-state magnetic field sensors 27 and an evaluation device 25 (see FIGS. 6, 11 and 12) for evaluating signals the magnetic field sensors 26.

Figure 1:
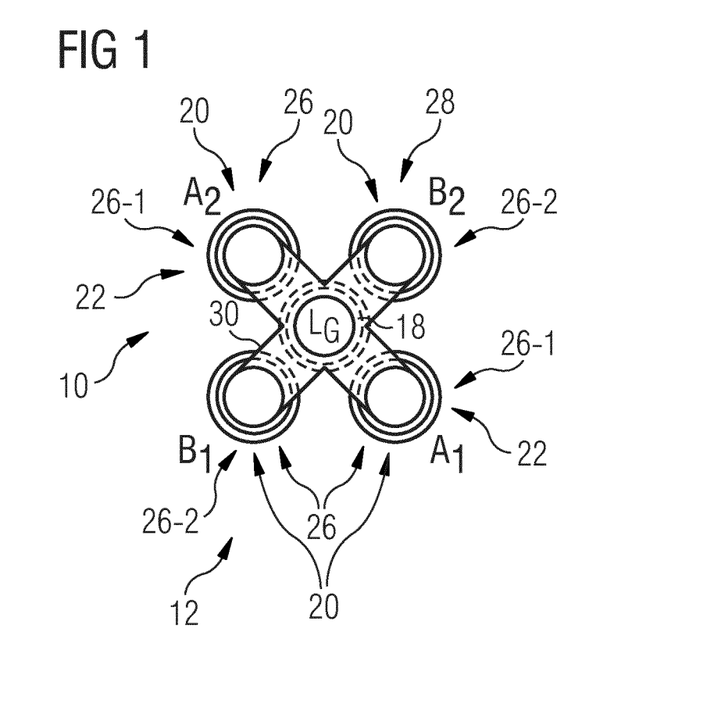
Figure 3:
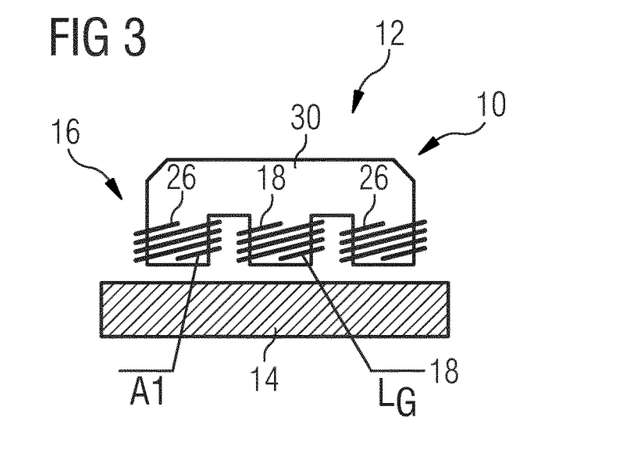
FIG. 3 a lateral view of the sensor head of FIG. 1 together with the test object.

The embodiment of the sensor head 10 shown in FIG. 1 with a view to the front side to be directed towards the test object 14 is shown in FIG. 3 from the side. This embodiment comprises two first magnetic field sensors 26-1 configured as first detector coils A1, A2 and two second magnetic field sensors 26-2 configured as second detector coils B1, B2. The detector coils A1, A2, B1, B2 are provided in a cruciform arrangement or X arrangement 28 on a common flux concentrator 30 from ferromagnetic material. The generator coil Lg is centrally arranged—here also on a corresponding projection of the flux concentrator 30—with the first detector coils A1 and A2 facing each other and the second detector coils B1 and B2 facing each other.

Figure 2:
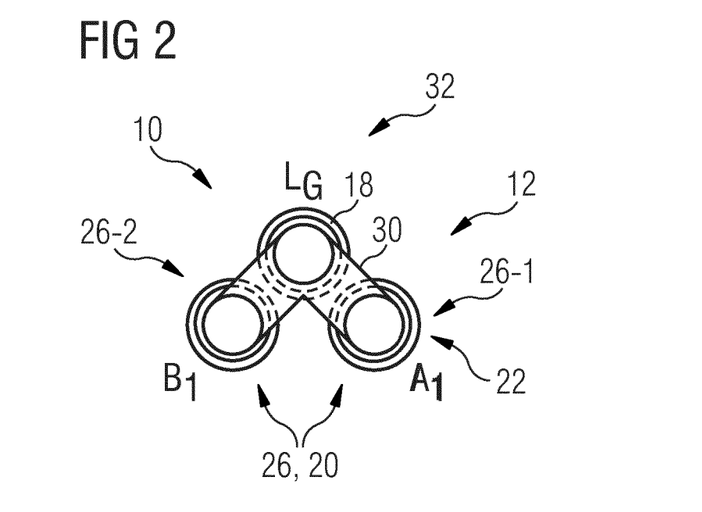
FIG. 2 a second preferred embodiment of the sensor head.

FIG. 2 shows a further embodiment of the sensor head 10 with a V arrangement 32 where only one first magnetic field sensor 26-1—e.g. the first detector coil A1—and only one second magnetic field sensor 26-1 are angularly arranged to each other, with the generator coil Lg at the tip of the angular configuration.

Figure 4:
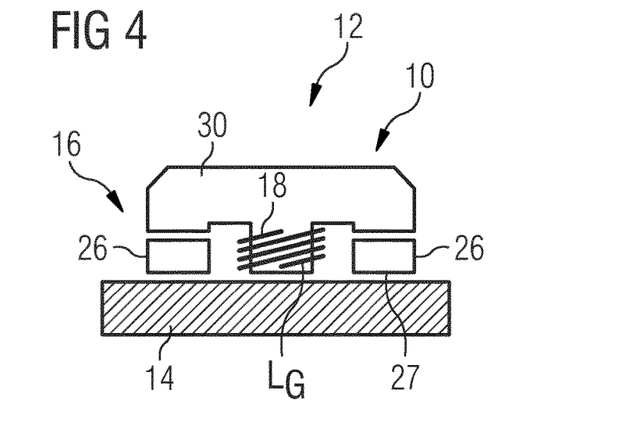
FIG. 4 a view similar to FIG. 3 of another embodiment of the sensor head.

As FIG. 4 shows, instead of detector coils, it also possible to provide solid-state magnetic field sensors 27 as first and second magnetic field sensors 26-1, 26-2.

Figure 5:
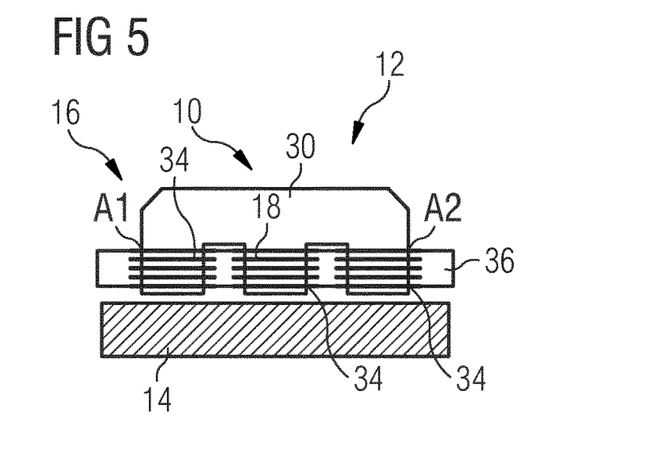
FIG. 5 a view similar to FIG. 3 of still another embodiment of the sensor head.

FIG. 5 shows one embodiment of the sensor head 10 in which the coils—detector coils A1, A2, B1, B2 and generator coil Lg—are designed as planar coils 34 in a printed circuit board element 36—e.g. designed as PCB boards.

The load measurement device 12 according to embodiments of the present invention implements a new signal processing concept for tapping and processing signals of the magnetic field sensors 26-1, 26-2.

The signal processing concept here described can be applied to any sensor system that has multiple magnetic field sensors 26-1, 26-2, such as four detector coils (A1, A2, B1 and B2 form an X-version) or also only two detector coils (A1 and B1 form a V-version).

In the illustrated embodiments, the magnetic field is generated via the flux concentrator 30 with the excitation coil or generator coil Lg.

Also other structures and designs can be used for the described signal processing. For example, it is also possible to employ a variety of different magnetic field sensors 27 (Hall sensors, MR or GMR (giant magneto resistance) sensors or the most various magnetic flux concentrators 30 available on the market.

Figure 6:
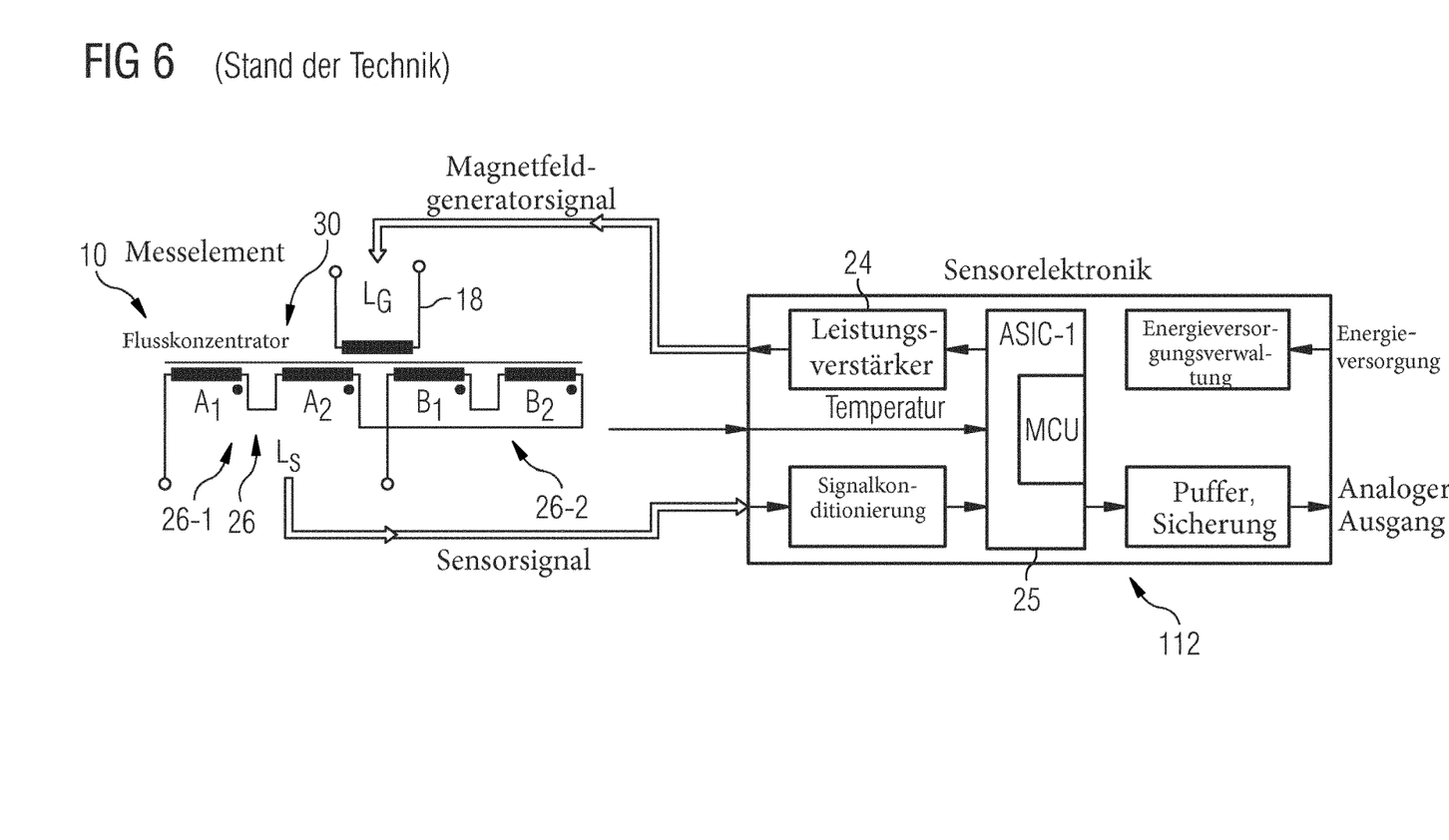
FIG. 6 a block diagram of a load measurement device according to prior art.

FIG. 6 shows a well-known load measuring device 112 in which such sensor heads 10 have been installed so far and which taps the analog signals of the detector coils A1, A2, B1, B2 in order to perform an analog differential measurement. FIG. 6 shows the basic set-up of the purely analog active magnetization (prior art—distributed by the company Torque and More under the name TAM A3 technology). The generator coil Lg, for example, is operated between 1 kHz and 20 kHz, the detector coils Ai or Bi (i=1 or 2) are operated between 1 kHz and 100 kHz.

As one can see from the interconnection of the coils on the left side of FIG. 6, the pair of first detector coils A1, A2 is for this purpose connected in series and the pair of second detector coils B1, B2 is also connected in series, the pairs being connected in series in opposite direction to each other.

This results in the output signal UAB:

$$UAB = UAT - UBT = (U(A1) + U(A2)) - (U(B1) + U(B2)),$$

where

UAT is the voltage of the pair A of first detector coils A1, A2,
UBT is the voltage of the pair B of second detector coils B1, B2,
U(A1) is the voltage of one first detector coil A1,
U(A2) is the voltage of the other first detector A2,
U(B1) is the voltage of one second detector coil B1, and
U(B2) is the voltage of the other second detector coil B2.

The measurement signal is the amplitude of UAB. The phase of UAB is not measured. As a result, the sign information is lost.

Figure 7:
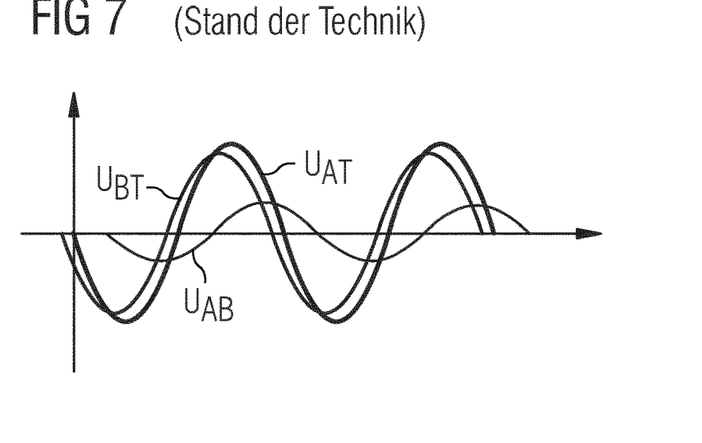
FIG. 7 a graph showing the voltage over time for pairs of coils of the load measuring device according to prior art of FIG. 6 in the event that a positive torque is applied to the test object.
Figure 8:
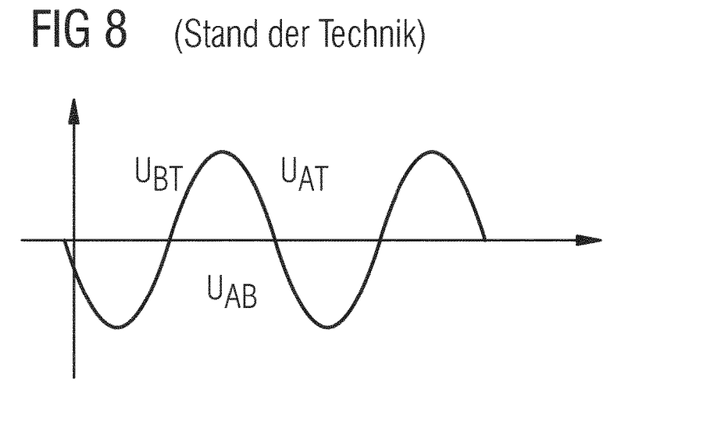
FIG. 8 the graph of FIG. 7 in the event that no torque is applied to the test object.
Figure 9:
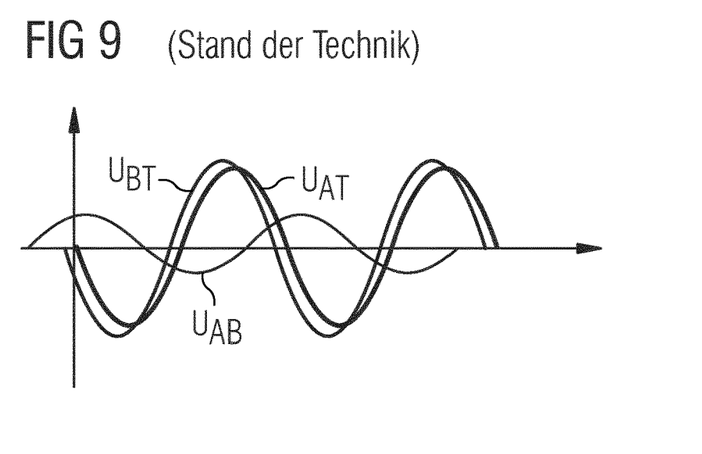
FIG. 9 the graph of FIG. 7 in the event that a negative torque is applied to the test object.

FIG. 7 shows the voltages UAB, UAT and UBT when a positive torque acts on the test object 14, FIG. 8 shows the voltages UAB, UAT and UAB when no torque acts on the test object, and FIG. 8 shows the voltages UAB, UAT and UBT when a negative torque acts on the test object 14.

For signal processing using the analog principle it is recommended to use the differential signal A–B as a direct analog measured value—in the form of the amplitude of the above-described voltage UAB—in order to obtain an optimal S/N ratio. Typically achievable noise values are approx. 8 μV based on a signal height of several mV (0.1% . . . 0.5% based on the entire measuring range=FS). Another problem is that the signal UAB (corresponds to A–B) contains amplitude information and phase information at the same time. The phase information results in a non-linearity in the measurement signal which can cause the characteristic curve to bend very strongly in the event of large signal changes; a clear torque direction cannot be determined. By specifically introducing an asymmetry (e.g. by using coils with a different number of windings) the operating point can be shifted, but uncertainties remain regarding the nonlinear behavior at the minimum, the unknown or changing operating point (before a complete measuring range has been passed through during calibration), and possible disadvantages concerning temperature and distance sensitivity.

Moreover, the well-known differential, single-channel approach shown in FIG. 6 also leads to the fact that (in any case independent of the number of coils) there is a phase offset between the detected signals of the two sensor coils (or of the two pairs of sensor coils) which should be compensated in order to obtain a correct result, i.e. a suitable difference. Due to the phase offset, the signal values of the two sensor coils (or of the two pairs of sensor coils) must not be used at the same time, but the phase offset must be taken into account and those signal values must be used for the difference formation which are relative to each other around the determined phase offset. In order to determine this phase offset, the zero crossings of the signals of the two sensor coils are used.

One method of avoiding these disadvantages is to sample the alternating magnetic field discretely and thus carry out a time-discrete measurement instead of a time-continuous measurement. If the amplitudes of A=(A1+A2) and B=(B1+B2) are measured directly, the S/N ratio (noise power of about 50 µV based on a useful signal of 10 . . . 20 mV) is slightly worse, but a clear determination of the torque direction and a separation of phase and amplitude are possible.

Particularly preferred embodiments of the method and device for measuring loads on test objects by means of active magnetization use time sampling of the difference of the amplitudes (A−B) and one of the two coil pairs A or B and from this the arithmetical determination of B (amplitude and phase) or for the second case A (amplitude and phase).

Sampling preferably takes place at very high frequencies (several 100 kHz), so that several thousand wave trains of the alternating magnetic field (samples) can be evaluated.

After averaging, between 100 and 1000 samples per second can be output as an output signal, so that the temporal resolution of the output signal is in the range of one to a few milliseconds.

The "signal-to-noise" (S/N ratio) value thus achieved is between 8,000 and 12,500 (corresponding to a mechanical load of 60 and 150 MPa) depending on the safety factor used. This corresponds to a noise of approx. 2 µV or 0.013% FS . . . 0.008% FS related to a measuring range of 16 . . . 25 mV useful signal.

In contrast to the purely analog measurement of UAT-UBT, both channels are preferably measured separately and thus amplitude and phase are determined separately.

Advantageously, no wound coils are used, but planar coils 34 integrated in a printed circuit board 36 as they have been known for some time, in order to achieve a high reproducibility of the manufacturing processes at low costs (see FIG. 5).

Figure 10:
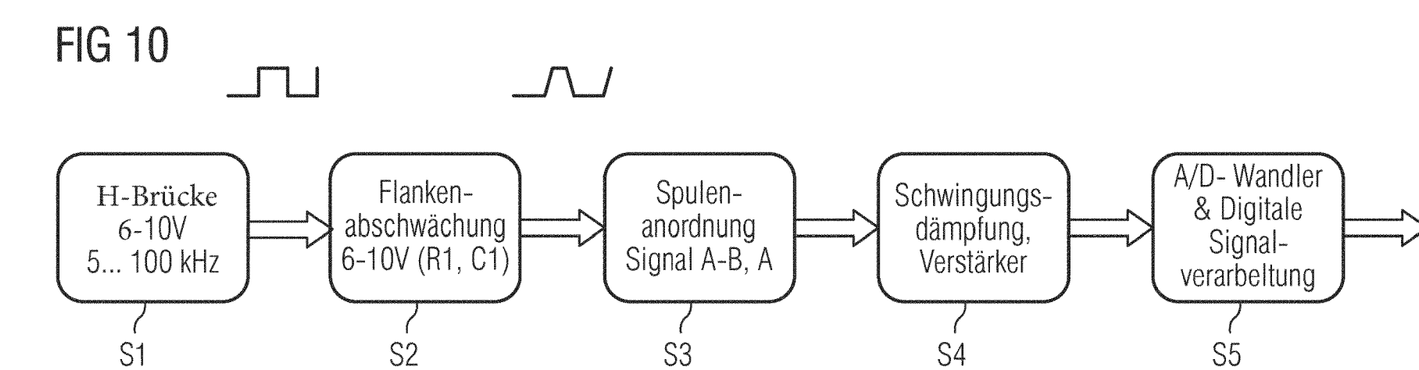
FIG. 10 a block diagram of the structure of a load measurement device according to one embodiment of the invention.
Figure 11:
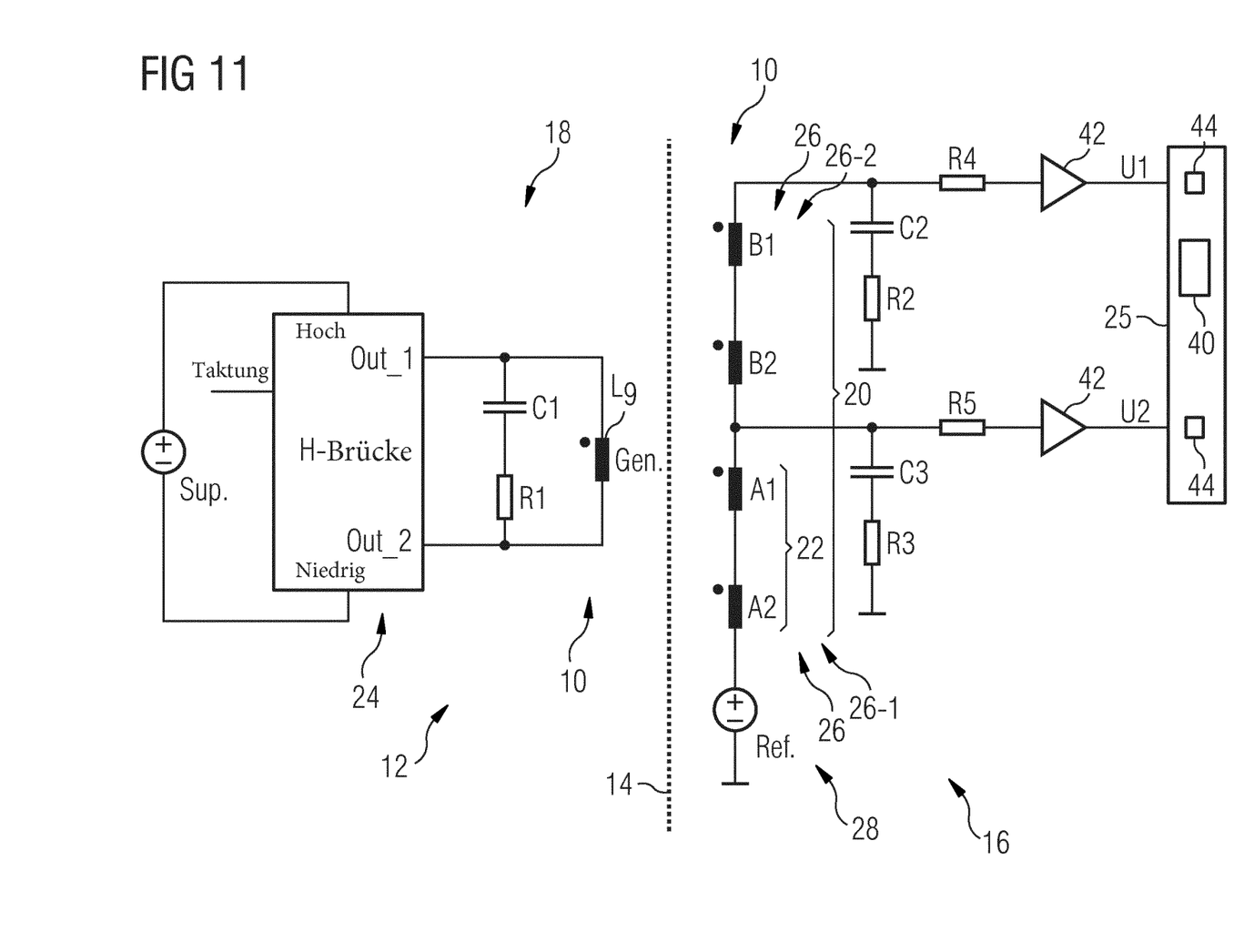
FIG. 11 a circuit diagram of a load measurement device according to one embodiment of the invention.

FIG. 10 shows a preferred design of the load measurement method in a temporal block sequence, while FIG. 11 shows a schematic block diagram of a preferred design of the load measuring device 12.

In this embodiment, a first magnetic field detection device 20 which supplies a first measurement signal U1 on a first channel comprises the first magnetic field sensors 26-1, A1, A2 and the second magnetic field sensors 26-2, B1 and B2, wherein the magnetic field sensors 26-1, 26-2, A1, A2, B1, B2 are connected in pairs in series (A1+A2) and (B1+B2) and in series in the opposite direction to each other as described above using prior art, if present in pairs. Thus, the first magnetic field detection device 20 corresponds to the analog structure and the analog channel of the single-channel known circuit from FIG. 6. The differential signal UAB is supplied as the measurement signal.

In addition, a second magnetic field detection device 22 is provided for supplying a second measurement signal U2, UAT, which comprises only the at least one first magnetic field sensor 26-1 (e.g. only the one first magnetic field sensor 26-1 in the V arrangement or only the pair of first magnetic field sensors A1+A2 in the X arrangement) and supplies the measurement signal only of the at least one first magnetic field sensor 26-1. Thus UAT is supplied as a measurement signal U2.

In addition, a computing device 40 is provided which calculates the measurement signal of the at least one second magnetic field sensor 26-2 from these measurement signals UAB and UAT.

FIG. 10 shows the magnetic field generation S1 by means of an H-bridge as a driver circuit 24 (see FIG. 11) with subsequent edge attenuation S2. The magnetic field generated in this way is applied to the test object 14 by means of sensor head 10 and in particular the generator coil Lg. In step S3—magnetic field detection—the signal A−B (in the form of U1=UAB) is tapped with the coil arrangement of the sensor head 10 and also the signal of the first magnetic field sensor(s) U2=UAT—corresponds to A—is tapped. In step S4, the tapped measurement signals U1, U2 undergo vibration damping by RC circuits R2-C2-R4 or R3-C3-R5 and amplification in a respective amplifier 42. They are then digitized in an AD converter and processed in the evaluation device 25.

FIG. 10 shows the digital signal evaluation path (from left to right), the last arrow stands for the digital output, signal processing enables compensation of temperature, hysteresis and distance sensor—test object.

FIG. 11 shows a basic circuit for the two-channel measurement data preparation. The driver circuit 24 in the form of an H-bridge (four-quadrant actuator, a typical motor driver=electronic H-bridge circuit consisting of four semiconductor switches (transistors) which convert a DC voltage (supply) into an AC voltage of variable frequency and variable pulse width (Out_1, Out_2) drives the generator coil Lg (Gen). R1 and C1 are used to generate sinusoidal signals from square-wave signals. For example, magnetic fields with frequencies in the range from 1 kHz to 20 kHz are generated.

Sampling preferably takes place with frequencies in the range from 1 kHz to several 100 kHz, and further preferably a common mode (e.g. implemented as software in a microprocessor) for improved amplitude measurement and an averaging over several wave trains (10 to 1000 wave trains) takes place.

A further advantage of the signal processing described is the freedom of choice of ferromagnetic materials for the flux concentrator 30, which can be used in this process in the respective combinations of coil—ferromagnetic material. In addition to iron cores milled from the raw material, current sensor heads 10 also use cores that are printed in 3D or transformer plates that have to be assembled at high cost.

There is now the prospect of not only commercial ferrite cores but also the core itself being completely omitted and the rear cover being covered with a metallic foil.

In other embodiments not further shown here, the outputs of the individual magnetic field sensors 26-1, 26-2, A1, A2, B1, B2 can be individually tapped and can be tapped and evaluated individually or in different combinations as differential signal or sum signal. In this way, different measurement signals can be tapped and further measurement signals can be calculated therefrom. The first and second magnetic field measuring devices 20, 22 can thus be constructed from different magnetic field sensors 26-1, 26-2, A1, A2, B1, B2.

The four detector coils (A1, A2, B1, B2) can be differently interconnected depending on the intended use in order to obtain a usable measurement signal via an amplifier 42.

The interconnection of the coils or more generally of the magnetic field sensors 26-1, 26-2 can take place on hardware form—e.g. via an appropriately designed PCB element 36—or in the form of switching electronics—e.g. controlled by software.

For this purpose, the outputs of the detector coils A1, A2, B1, B2 can be individually connected to sensor electronics, which interconnects the outputs or evaluates them individually depending on the intended use. In particular, subsets of the detector coils can be tapped in a rectified manner in order to generate a sum signal, or tapped with mutually different polarity in order to tap a differential signal.

One advantage of such a preferred design of the signal processing described here resides in a mutual connection of the pairs of coils, so connection (A1−B1) −(A2−B2) allows local defects (for example cracks in the shaft) to be detected (this is not possible today with the A3 integral sensor designed as X).

This possibility of an alternating (e.g. mutual) connection still has a further advantage, because within the scope of safety-relevant applications (e.g. SIL classification according to the IEC 61508 series of standards "functional safety of safety-related electrical/electronic/programmable electronic systems"), various methods for controlling or eliminating faults can be supported. This enables monitoring during operation for the detection of random faults as well as the safe control of detected faults and the transition to a safely defined state. For this purpose, two signal paths can be used, in which evaluation takes place in the first channel (A1−B1) and in the second channel (A2−B2). If, for example, these two originally identical values differ by more than twice their specification, the two pieces of information can be set off against each other and, if necessary, checked for plausibility.

If the coils (A1+B1)−(A2+B2) are connected, it is advantageously possible to find out whether stress gradients or transverse forces occur—but this constellation is used, for example, in applications in which varying axle loads and different traction ratios are to be determined, but not exclusively.

If the coils A1, A2, B1, B2 are sampled directly and set off against each other in a second process step, additional information on the temporal signal invariance can be obtained.

In the range of large diameters >100 mm of the test object 14 (e.g. a shaft), the methodology can be advantageously used to arrange several individual sensors around a rotating shaft (as described and shown in DE 10 2017 107 111.3) and then to set off their measurements—in this case, the signal to be analyzed is based on the multiple wiring n[(A1+A2)−(B1+B2)], which then permits averaged data processing in a second step. For example, n=the number of measurement points assumes values between four and sixteen.

All the interconnections and constellations described can generally be operated either in an "X" mode (X arrangement 28, FIG. 1) or in a "V" mode (V arrangement 32, FIG. 2), in the first case four detector coils are provided in addition to the generator coil Lg, in the second case two detector coils are provided in a special arrangement (angle between 70 and 110°). In the case of two coils (V arrangement 32) A1−B1 is selected, which has the advantage that a simple integral sensor consisting of two to sixteen elements, for example, as described in DE 10 2017 107 111.3 for four measuring elements, permits a significantly higher resolution around the shaft and thus the signal non-uniformity can be further improved in the case of poor concentricity (from 1% FS to 0.2% FS).

Finally, the phase between A or B relative to the generator as well as the sampled signal (A−B) relative to the generator can be derived from the alternating fields at Lg and at Ai, Bi (with i=1 or the relative phase relationship between signal A and B) and can be usefully further calculated.

In this context, the reverse-connected (see coil orientation at the beginning of the windings) and the synchronized constellation of all the variants described are also considered to be covered by the invention.

A preferred configuration of the method for measuring a force or voltage applied to a test object 14 comprises the following steps:
generating a magnetic field;
applying the generated magnetic field to the test object 14;
applying a force to the test object 14;
detecting the magnetic field changed by the test object 14 as a result of the applied force with a first magnetic field detection device 20 and providing a first measurement signal U1, UAB with the first magnetic field detection device 20 ("A−B");
detecting the magnetic field changed by the test object 14 as a result of the applied force with a second magnetic field detection device 22 and providing a second measurement signal U2, UAT with the second magnetic field detection device 22 ("A" or "B");
computational determination of the third measurement signal UBT ("B" or "A") from the first measurement signal ("A−B") and the second measurement signal ("A" or "B");
determining the resulting signal "output signal A*−B*" as the difference between the second measurement signal and the third, computationally determined measurement signal=amplitude (A)−amplitude (B);
determining the force or tension applied to the test object based on the resulting signal.

Preferably, the sum signals of coils A1+A2+B1+B2 can be tapped and evaluated, so that a measurement of a distance to the test object 14 can be realized in an advantageous manner. Thus, in addition to the force or tension, the distance of the sensor head 10 to the test object 14 can also be measured.

Furthermore, an averaged common mode is preferred in order to achieve a simplified amplitude measurement.

Preferably an additional or alternative measuring signal of a wiring (A1+B1) −(A2+B2) can be tapped.

As mentioned above, two or four solid-state magnetic field sensors 27 can be used instead of the detector coils A1, A2, B1, B2. Especially when such magnetic field sensors 27 are used, the concept shown here also works with direct current and/or a non-changing magnetic field.

LIST OF REFERENCE SIGNS 10 sensor head
12 load measurement device 14 test object
16 load measurement arrangement
18 magnetic field generating device
20 first magnetic field detection device
22 second magnetic field detection device
24 driver circuit
25 evaluation device
26 magnetic field sensor
26-1 first magnetic field sensor
26-2 second magnetic field sensor
27 solid-state magnetic field sensor
28 X arrangement
30 magnetic flux concentrator
32 V arrangement
34 planar coil
36 printed circuit board element
40 computing device
42 amplifier
44 A/D converter
112 load measurement device (prior art)
A1 first detector coil
A2 first detector coil
B1 second detector coil
B2 second detector coil
Lg generator coil
S1 magnetic field generation
S2 edge attenuation
S3 magnetic field detection
S4 vibration damping, amplification
S5 A/D conversion, signal processing

The invention claimed is:

1. A load measurement method for measuring a mechanical load on a test object (14), comprising:
    a) generating and applying a magnetic field to the test object (14),
    b) detecting a magnetic field changed by the test object (14) as a result of a mechanical load on the test object (14) by means of a first magnetic field detection device (20) to generate a first measurement signal (U1, UAB),
    c) detecting a magnetic field changed by the test object (14) as a result of a mechanical load on the test object (14) by means of a second magnetic field detection device (22) to generate a second measurement signal (U2, UAT),
    d) computational determination of a third measurement signal (UBT) from the first measurement signal (U1, UAB) and the second measurement signal (U2, UAT) and
    e) determination of an output signal from the third measurement signal and at least one of the first and second measurement signals (U1, U2) and
    f) determination of the mechanical load applied to the test object (14) based on the output signal.

2. The load measurement method according to claim 1, characterized in that
    2.1. step e) comprises:
    forming the difference from one (U2, UAT) of the first and second measurement signals and the computationally determined third measurement signal (UBT) to produce the output signal and/or
    2.2 step b) comprises:
    detection of the changed magnetic field by means of multiple series-connected magnetic field sensors (26-1, 26-2; A1, A2, B1, B2) and tapping a sum or differential signal (UAB, U1) from these magnetic field sensors (26-1, 26-2; A1, A2, B1, B2) and step c) comprises:
    detection of the changed magnetic field by means of one (A1) or a subset (26-1, A1, A2) of these magnetic field sensors (26-1, 26-2; A1, A2, B1, B2) to tap a partial signal (U2, UAT) from the said one or said subset of the magnetic field sensors (26-1, 26-2; A1, A2, B1, B2).

3. The load measurement method according to claim 2, characterized in that
    4.1 step b) comprises detecting the changed magnetic field by means of at least two first magnetic field sensors (26-1, A1, A2) and at least two second magnetic field sensors (26-2, B1, B2) and that step b) comprises using such interconnection of the magnetic field sensors (26-1, 26-2) that in each case the signals of a pair of a first (A1, A2) and a second (B1, B2) magnetic field sensor added in analog fashion and the signals of the pairs (A1, A2; B1, B2) subtracted in analog fashion are output as an analog differential signal (U1, UAB) and/or
    4.2 further the sum signals of the at least one first magnetic field sensor (26-1) and the at least one second magnetic field sensor (26-2) are tapped and are evaluated in particular for determining a distance to the test object (14) and/or
    4.3 an amplitude of the signal from the at least one second magnetic field sensor (26-2) is determined as a third measurement signal in order to determine a difference of the amplitudes of the signals from the at least one first magnetic field sensor (26-1) and the at least one second magnetic field sensor (26-2) as a resulting output signal and/or
    4.4 a coil (A1, A2, B1, B2) or a solid-state magnetic field sensor (27) is used as a magnetic field sensor (26-1, 26-2) and/or
    4.4 the interconnection of the multiple magnetic field sensors (26-1, 26-2; A1, A2, B1, B2) is varied in order to tap different sum or differential signals from the multiple magnetic field sensors.

4. The load measurement method according to claim 1, characterized in that
    step b) comprises detecting the changed magnetic field by means of at least one first magnetic field sensor (26-1) and at least one second magnetic field sensor (26-2) and tapping a differential signal from the at least one first (26-1) and the at least one second (26-2) magnetic field sensor to thus produce the first measurement signal and
    step c) comprises detecting the changed magnetic field by means of the at least one first magnetic field sensor (26-1) to thus produce the second measurement signal and
    step d) comprises the computational determination of the measurement signal of the second magnetic field sensor (26-2) from the differential signal and the measurement signal of the first magnetic field sensor (26-1).

5. The load measurement method according to claim 1, characterized in that
    5.1 step a) comprises imposing an alternating magnetic field, in particular with frequencies from 1 kHz to 1000 kHz and
    step b) and c) comprise averaging the measurement signals over multiple wave trains, wherein an averaging over between 10 and 10000 wave trains takes place and/or
    5.2 at least one sensor head (10) is used having the magnetic field sensors (26-1, 26-2; A1, A2, B1, B2) of the first and the second magnetic field detection device (20, 22) and a generator coil (Lg) of the magnetic field generation device (18) and/or 5.3 multiple sensor heads (10) which each include magnetic field sensors (26-1, 26-2; A1, A2, B1, B2) of the first and the second magnetic field detection device (20, 22) and a generator coil (Lg) of the magnetic field generation device (18) are distributed around the test object (14) and are used for common measurement signal generation, 5.4 at least one sensor head (10) is used which includes planar coils (34) as magnetic field sensors (26-1, 26-2; A1, A2, B1, B2) of the first and the second magnetic field detection device (20, 22) and as a generator coil (Lg) of the magnetic field generation device (18) which are arranged in or on a printed circuit board element (36).

6. The load measurement method according to claim 1, characterized in that steps b) and c) comprise an averaged common mode for amplitude measurement.

7. The load measurement method according to claim 1, characterized in that at least one X arrangement (28) or V arrangement (32) of magnetic field sensors (26-1, 26-2) of the first and the second magnetic field detection devices (20, 22) and the magnetic field generating device (18) are used with a common ferromagnetic amplification core (30).

8. The load measurement method according to claim 7, characterized in that several X or V arrangements (28, 32) are used which are distributed around the test object (14).

9. A load measurement device (12) for measuring a mechanical load on a test object (14), comprising:

a magnetic field generating device (18) for applying a magnetic field to the test object (14), a first magnetic field detection device (20) for detecting a magnetic field changed by the test object (14) as a result of a mechanical load on the test object (14) and for supplying a first measurement signal (U1, UAB), a second magnetic field detection device (22) for detecting a magnetic field changed by the test object (14) as a result of a mechanical load on the test object (14) and for supplying a second measurement signal (U2, UAT), and a computing device (40) for computationally determining a third measurement signal (UBT) from the first measurement signal (U1, UAB) and the second measurement signal (U2, UAT) and an evaluation device (25) configured to generate an output signal indicating a mechanical load from the third measurement signal (UBT) and at least one of the first (UAB) and the second measurement signal (UAT).

10. The load measurement device according to claim 9, characterized in that 10.1 the evaluation device (25) is configured to form a difference from one (UAT) of the first and the second measurement signals and the computationally determined third measurement signal (UBT) to produce an output signal based on which the mechanical load applied to the test object (14) can be determined and/or 10.2 the first magnetic field detection device (20) includes multiple magnetic field sensors (26-1, 26-2; A1, A2, B1, B2) which are connected in series in order tap a common signal (UAB, U1) from the multiple magnetic field sensors (26-1, 26-2; A1, A2, B1, B2) and the second magnetic field detection device (22) includes one (A1) or a subset (26-2, A1, A2) of these magnetic field sensors (26-1, 26-2; A1, A2, B1, B2) belonging to the first magnetic field detection device (20) in order to tap a signal from only a portion of the magnetic field sensors (26-1, 26-2; A1, A2, B1, B2) of the first magnetic field detection device (20).

11. The load measurement device according to claim 10, characterized in that 12.1 the first magnetic field detection device (20) comprises at least two first magnetic field sensors (26-1, A1, A2) and at least two second magnetic field sensors (26-2, B1, B2) and such interconnection of the magnetic field sensors (26-1, 26-2, A1, A2, B1, B2) that in each case the signals (UAT, UBT) of a pair (A1, A2; B1, B2) of a first (26-1) and a second (26-2) magnetic field sensor added in an analog fashion and the signals of the pairs subtracted in an analog fashion are output as an analog differential signal (U1, UAB) and/or 12.2 there is further provided a sum signal tapping device for tapping sum signals of the at least one first magnetic field sensor (26-1) and the at least one second magnetic field sensor (26-2), wherein the evaluation device (25) is configured in particular to determine a distance to the test object (14) by evaluating the sum signals and/or 12.3 the computing device (40) is configured to determine an amplitude of the signal of the at least one second magnetic field sensor (26-2) as a third measurement signal and that the evaluation device (25) is configured to determine a difference of the amplitudes of the signals from the at least one first magnetic field sensor (26-1) and the at least one second magnetic field sensor (26-2) as a resulting output signal and/or that 12.4 coils (A1, A2, B1, B2) or solid-state magnetic field sensors (27) serve as magnetic field sensors (26-1, 26-2) and/or 12.5 a device for variably interconnecting the magnetic field sensors (26-1, 26-2, A1, A2, B1, B2) is provided, in particular for reversing or rectifying the polarity of one or a subset (26-1, A1, A2) of the magnetic field sensors relative to the remaining magnetic field sensors (26-2, B1, B2).

12. The load measurement device (12) according to claim 9, characterized in that the first magnetic field detection device (20) includes at least one first magnetic field sensor (26-1) and at least one second magnetic field sensor (26-2) and is configured to tap a difference of amplitudes of signals of the first and the second magnetic field sensors (26-1, 26-2) from the at least one first (26-1) and the at least one second magnetic field sensor (26-2), this difference forming the first measurement signal (U1, UAB) and that the second magnetic field detection device (22) comprises the at least one first magnetic field sensor (26-1) and is configured to output an amplitude as a second measurement signal from the first magnetic sensor (26-1) and that the computing device (40) is configured to computationally determine the amplitude of the second magnetic field sensor (26-2) from the differential signal (UAB) and the measurement signal of the first magnetic field sensor (26-1) and output this amplitude as a third measurement signal.

13. The load measurement device (12) according to claim 9, characterized that the magnetic field generation device (18) is configured to impose an alternating magnetic field, in particular with frequencies from 1 kHz to 1000 kHz, on the test object and that the evaluation device (25) is configured to average the measurement signals over multiple wave trains, wherein averaging over between 10 and 10000 wave trains takes place.

14. The load measurement device (12) according to claim 9,
characterized in that
- 14.1 a common mode device for an averaged common mode of the magnetic field sensors for amplitude measurement is provided and/or
- 14.2 the magnetic field sensors (26, 26-1, 26-2) of the first and the second magnetic field detection device (20, 22) and the magnetic field generation device (18) form an X arrangement or a V arrangement (32), preferably with a common ferromagnetic amplification core and/or
- 14.3 at least one sensor head (10) is provided which includes magnetic field sensors (26-1, 26-2; A1, A2, B1, B2) of the first and the second magnetic field detection device (20, 22) and a generator coil (Lg) of the magnetic field generation device (18) and/or
- 14.4 multiple sensor heads (10) which each include magnetic field sensors (26-1, 26-2; A1, A2, B1, B2) of the first and the second magnetic field detection device (20, 22) and a generator coil (Lg) of the magnetic field generation device (18) are distributed around the test object (14) and are configured for common signal generation,
- 14.5 at least one sensor head (10) is provided which includes planar coils 34) as magnetic field sensors (26-1, 26-2; A1, A2, B1, B2) of the first and the second magnetic field detection device (20, 22) and as a generator coil (Lg) of the magnetic field generation device (18) which are arranged in or on the circuit board element (36).

15. A load measurement arrangement (16), comprising the load measurement device (12) according to claim 9 and a test object (14) the load of which is to be measured.

* * * * *